United States Patent
Nagai et al.

[11] Patent Number: 5,900,140
[45] Date of Patent: May 4, 1999

[54] FUEL FILTER MODULE WITH C-SHAPED CROSS-SECTION FILTER

[75] Inventors: Takashi Nagai, Handa; Nobuo Suzuki, Obu; Genjiro Tada, Kariya; Hironori Ueda, Handa; Ryuji Kuwabara, Yokohama; Soichi Kawakami, Gyoda; Tsuyoshi Yao, Yokohama, all of Japan

[73] Assignee: Aisan Kogyo Kabushiki Kaisha, Obu, Japan

[21] Appl. No.: 08/885,181

[22] Filed: Jun. 30, 1997

[30] Foreign Application Priority Data

Jul. 2, 1996 [JP] Japan .................................. 8-172518

[51] Int. Cl.⁶ .................................................. B01D 35/26
[52] U.S. Cl. ........................ 210/85; 210/416.4; 210/444; 210/450; 210/493.2; 210/497.01
[58] Field of Search ................................ 210/172, 416.1, 210/416.4, 443, 444, 450, 453–455, 493.1, 493.2, 497.01, 85

[56] References Cited

U.S. PATENT DOCUMENTS 5,511,957  4/1996  Tuckey et al. ........................ 210/416.4

FOREIGN PATENT DOCUMENTS 56-45643  10/1981  Japan .................................. 210/493.1
4-109465  9/1992  Japan .
9623569  8/1996  WIPO .
9623966  8/1996  WIPO .

OTHER PUBLICATIONS

Disclosure No. 94–17602, JIII Journal of Technical Disclosure, Sep. 16, 1994, including translation.

Primary Examiner—Matthew O. Savage
Attorney, Agent, or Firm—Dennison, Meserole, Pollack & Scheiner

[57] ABSTRACT

In a fuel filter module for introducing fuel from a fuel inlet into a casing and for removing foreign matter from the fuel by passing the fuel through a fuel member and for discharging the fuel through a fuel outlet to the outside of the casing, and the casing is formed to have a D-shaped cross section. With this construction, the outer diameter of the casing is not increased even when an accessory is assembled on the outside plane wall of the D-shaped casing. The casing accommodates a filter member of C-shaped cross section. The center of a C-shaped sealing member provided for sealing the upper edge of the filter member is offset from the center of the casing. By thus offsetting, sufficient areas for fuel inlet and outlet can be ensured without increasing the size of the casing.

7 Claims, 11 Drawing Sheets

FUEL FILTER MODULE WITH C-SHAPED CROSS-SECTION FILTER

BACKGROUND OF THE INVENTION

1. Field of the Invention

This invention relates to a fuel filter which introduces fuel from a fuel inlet into a casing, which filters foreign matter from the fuel by passing the fuel through a filter member, and which discharges the filtered fuel from a fuel outlet to the outside of the casing.

2. Description of the Prior Art

Such a conventional fuel filter is disclosed in Japanese Laid-Open Utility-Model Publication No. 4-109465. The fuel filter of this type includes a substantially cylindrical casing which accommodates a substantially cylindrical filter member. In the fuel filter disclosed in Laid-Open Utility Model 4-109465, a fuel inlet communicates with the interior of the cylindrical filter member and a fuel outlet communicates with the outside of the filter member. The fuel introduced from the fuel inlet into the interior of the cylindrical filter member moves to the outside of the filter member after foreign matter is filtered therefrom. Then, the fuel free from the foreign matter is fed from the fuel outlet to the outside of the casing.

FIG. 13 is a view of a module in which a conventional fuel filter is used. Numeral 90 designates a cylindrical housing for accommodating a substantially cylindrical fuel filter. The housing 90 should be formed to have a circular cross section in order to accommodate the fuel filter having a circular cross section.

Specifically, the housing 90 which accommodates the fuel filter of the circular cross section is also required to have the circular cross section, thus increasing the outer diameter of the module in which an attachment such as a sensor is assembled to the housing 90.

FIG. 13 shows the module wherein the fuel filter of the circular cross section is accommodated in the housing 90 of the circular cross section and wherein an attachment such as a sensor 93 is mounted on a peripheral wall of the housing 90. This module includes a set plate 91 attached to the housing 90 and a mounting portion 92 for mounting the attachment thereon. The attachment 93 such as a sensor is mounted on the mounting portion 92 with mounting members 94 or bolts.

When the module is constructed by mounting the attachment 93 to the housing 90 having the circular cross section, the outer diameter of the module will be considerably larger than that of the housing 90. A large outer diameter of the module requires a large bore to be provided to a fuel tank for inserting the module into the fuel tank.

SUMMARY OF THE INVENTION

Accordingly, an object of the present invention is to provide such a fuel filter that the outer diameter of a module is relatively small even when an attachment is assembled to the module.

Another object of the present invention is to provide a construction of the fuel filter by which a fuel inlet area and a fuel outlet area can be sufficiently ensured without increasing the outer diameter of the module.

A fuel filter of the present invention includes a partly cylindrical casing of a D-shaped cross section having a fuel inlet and an outlet, and a filter member accommodated in the casing so as to separate the fuel inlet from the fuel outlet.

By using the above described fuel filter, the circle of the outer periphery of the casing is partly and linearly cut into a D-shaped cross section, thus permitting the sensor-like attachment to be assembled to the linearly cut flat surface of the casing. Thus, the outer diameter of a module can be relatively small by assembling the attachment.

According to an embodiment of the present invention, the cross section of the filter member is formed into the C-shape such that the center of the arc of the C-shape of the filter member is in conformity with that of the arc of the D-shape of the casing. With this construction, the outside dimension of the fuel filter is decreased relative to the prior art.

In order to seal an axial end plate of the casing from an axial edge of the filter member, a sealing member having a C-shape is used such that the center of the arc of the C-shape of the sealing member is offset from the center of the arc of the D-shape of the casing. With this construction, it becomes easier to ensure the fuel inlet area, and the fuel outlet are in the casing.

The present invention will be more fully understood from the following detailed description and appended claims when taken with the accompanying drawings.

DETAILED DESCRIPTION OF THE PREFERRED EMBODIMENTS

Figure 1:
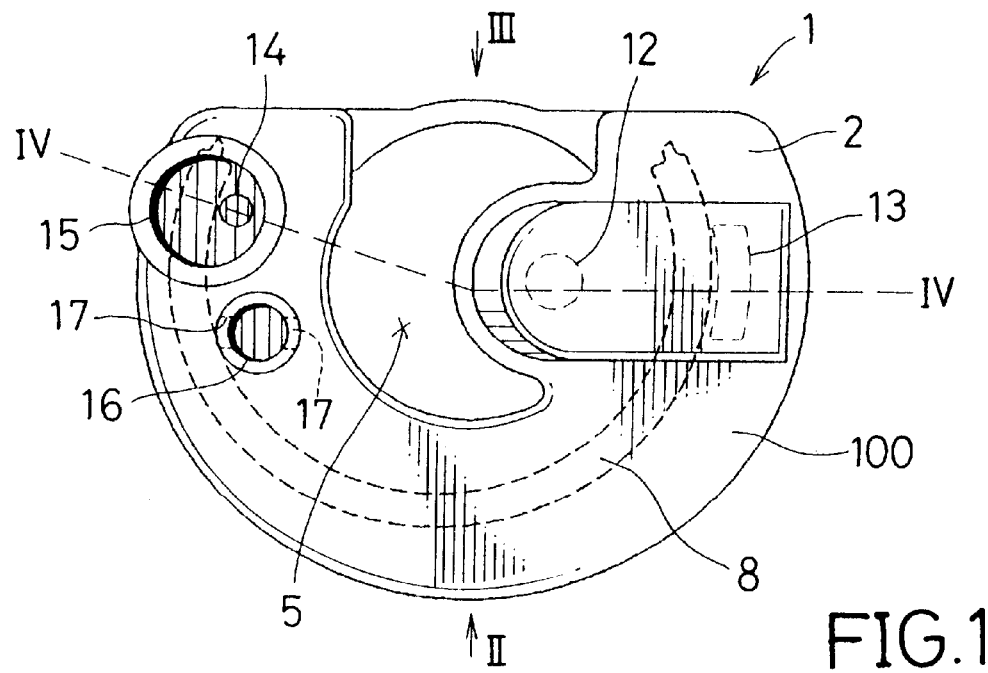
FIG. 1 is a plan view of a fuel filter according to an embodiment of the present invention.
Figure 2:
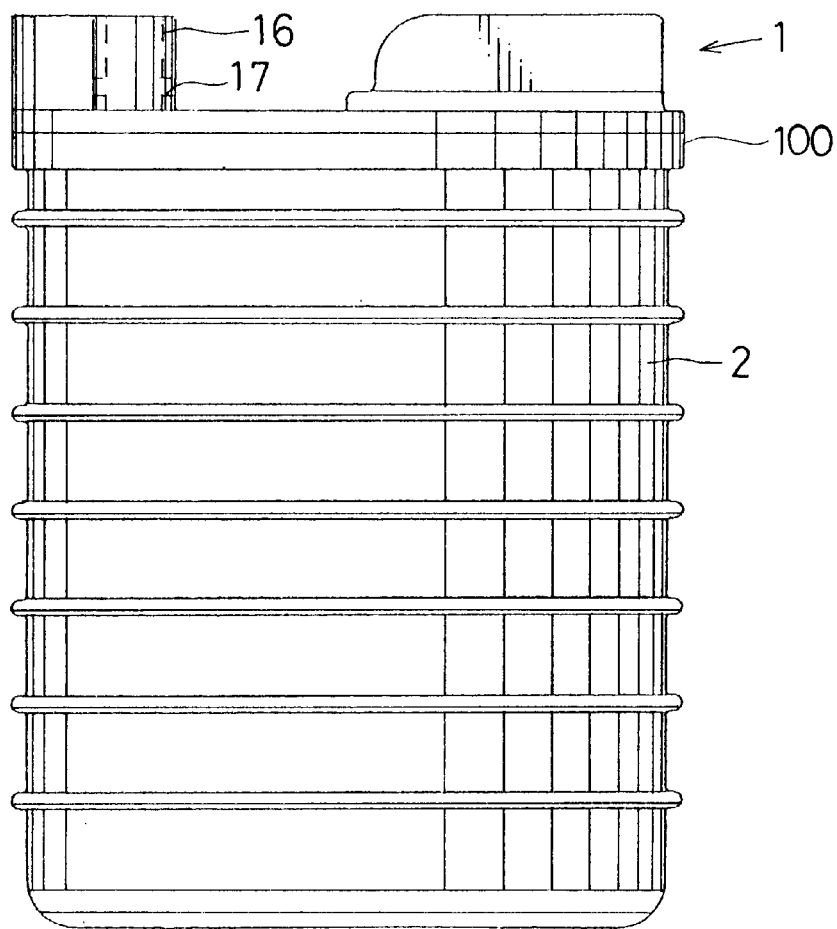
FIG. 2 is a view, looking in the direction of arrow II of FIG. 1.
Figure 3:
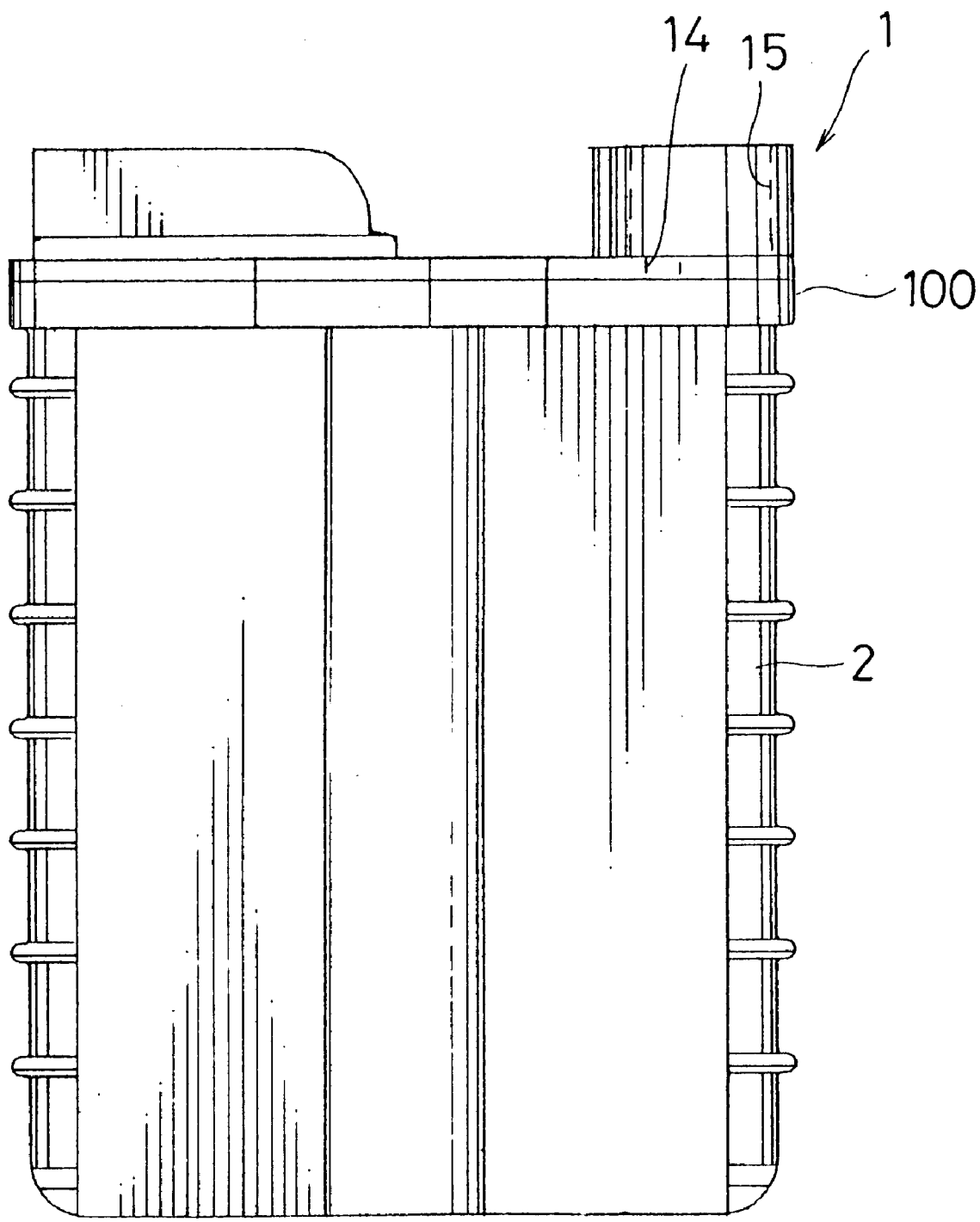
FIG. 3 is a view, looking in the direction of arrow III of FIG. 1.

With reference to the drawings, an embodiment of the present invention will now be described. In FIGS. 1 to 4, a casing 2 of a fuel filter 1 formed of synthetic resin includes an inner peripheral wall 3 of a circular cross section (shown in FIGS. 4 to 6) and an outer peripheral wall 4 of a D-shaped cross section. The upper end of the casing 2 is closed with an end plate 100. The interior surrounded by the inner peripheral wall 3 is a space 5 for accommodating a fuel pump. The fuel pump is inserted from an inserting port 6 provided at the lower side into the space 5. The outer peripheral wall 4 which determines an outline of the casing 2 has a D-shaped cross section to thereby render the cross section of the fuel filter 1 to be a D-shape. The casing 2 of the embodiment may be formed of materials other than synthetic resin. However, it is relatively easier to fabricate a resin-made casing.

Figure 5:
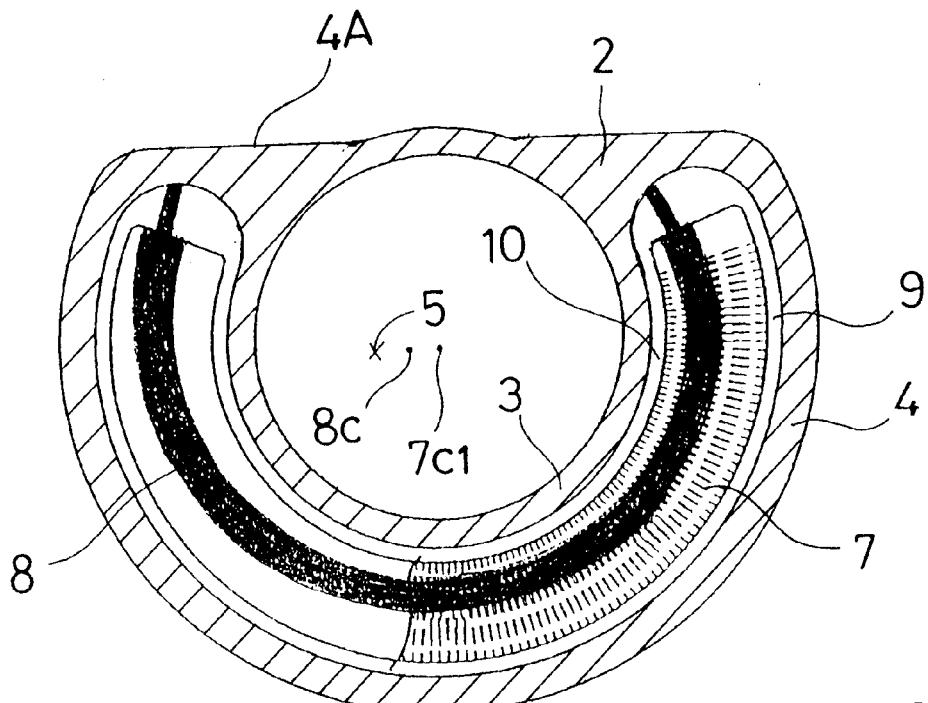
FIG. 5 is a cross sectional view taken along line V—V of FIG. 4.
Figure 6:
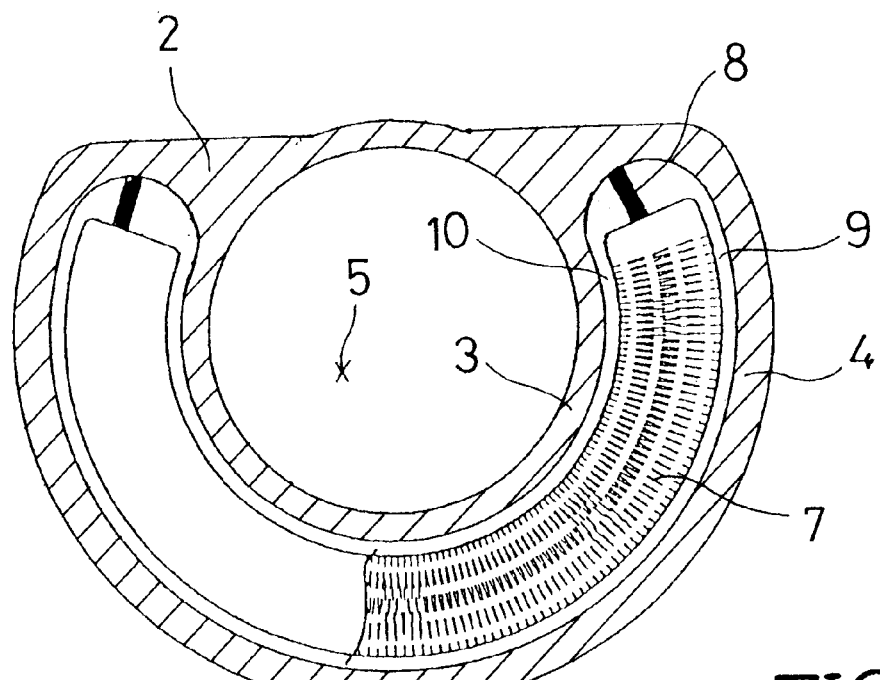
FIG. 6 is a cross sectional view taken along line VI—VI of FIG. 4.

Between the inner peripheral wall 3 of the casing 2 and the outer peripheral wall 4 thereof, a filter member 7 of a C-shaped cross section is accommodated (best shown in FIGS. 5 and 6 ). The filter member 7 is a fanfold sheet which is curved into the C-shape and which is made of a filter medium capable to be able to filter foreign matter from the fuel passing through the filter medium. Any cross sectional shapes of the filter member 7 may be used as long as they can be accommodated in the D-shaped space formed between the inner peripheral wall 3 and the outer peripheral wall 4.

In a space formed between the inner peripheral wall 3 and the filter member 7, a fuel outlet chamber 10 is formed. In a space formed between the filter member 7 and the outer peripheral wall 4, a fuel inlet chamber 9 is formed. Peripheral edges of the filter member 7 are attached to a casing 2 via a sealing member 8 (best shown by FIGS. 7(a) and 7(b)) so that foreign matter is prevented from passing between the fuel inlet chamber 9 and the fuel outlet chamber 10 without passing through the filter member 7. When the filter member 7 or the casing 2 has a sealing function, no additional sealing member is required.

Figure 4:
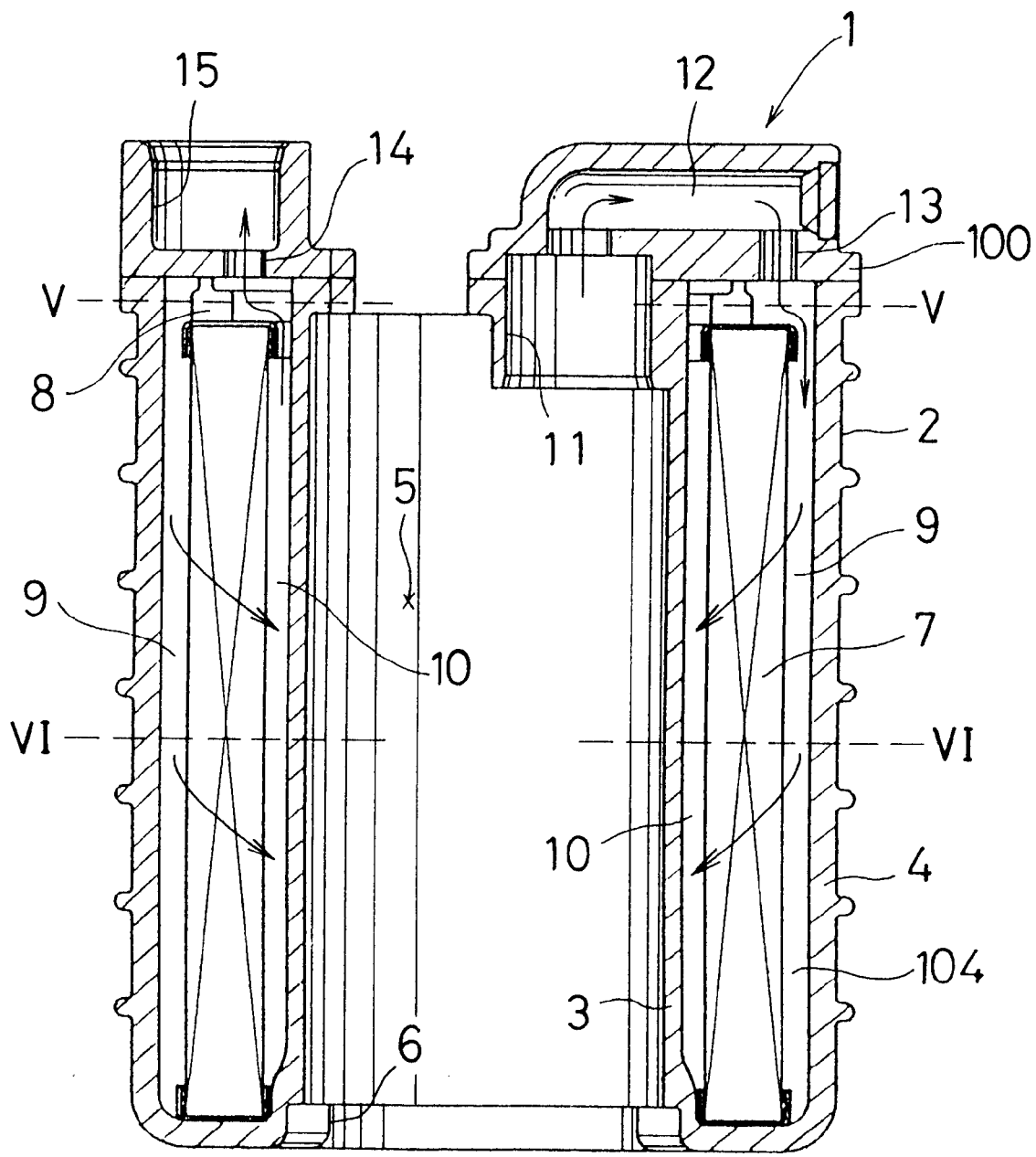
FIG. 4 is a vertical sectional view taken along line IV—IV of FIG. 1.

As best shown in FIG. 4, the end plate 100 of the casing 2 is provided with a mounting hole 11 on the fuel inlet side of the casing 2. The mounting hole 11 is communicated via a fuel passage 12 and a fuel inlet 13 with the fuel inlet chamber 9. The fuel pump is mounted to the mounting hole 11 when the fuel pump is positioned in the interior space 5 of the inner peripheral wall 3. The end plate 100 of the casing 2 is also provided with a mounting hole 15. The mounting hole 15 is communicated via a fuel outlet 14 with the fuel outlet chamber 10. To the mounting hole 15, a fuel supply pipe is mounted to supply fuel to a main pipe.

Figure 7A:
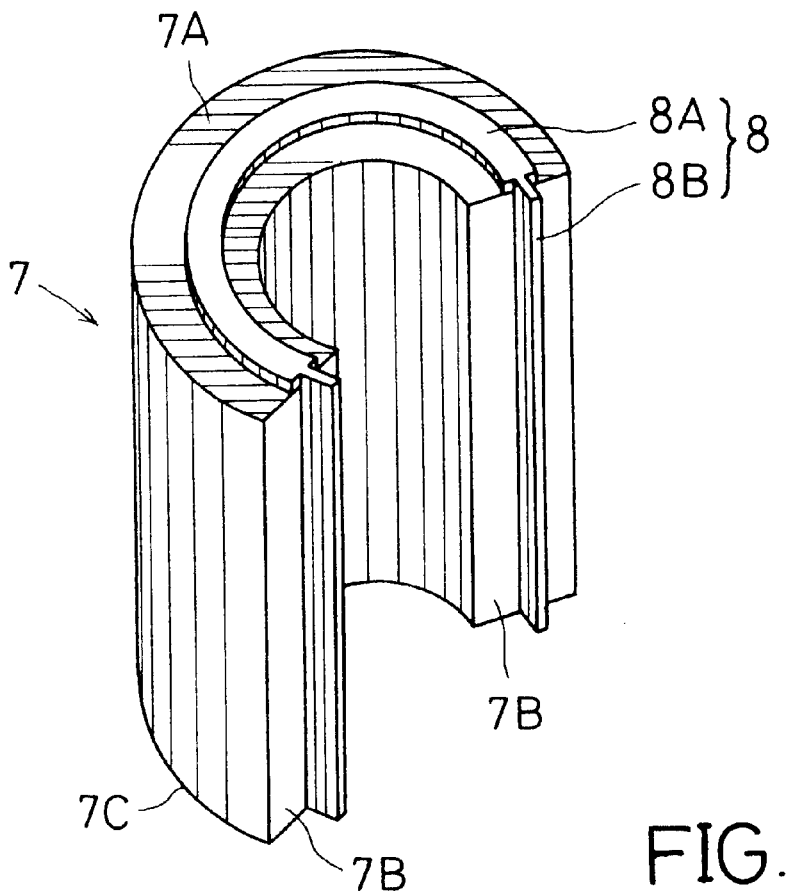
FIGS. 7(a) and 7(b) are views each showing a construction of a sealing member.

The construction of the sealing member 8 is properly modified in accordance with the filter member 7 used. As shown in the above embodiment, when using a filter member of a filter medium sheet, the sealing member 8 is used at its axial edges and circumferential edges. FIG. 7(a) shows an example in which the filter member 7 is fixed to the sealing member 8 so that an upper sealing section 8A of the sealing member 8 of C-shaped cross section seals an area between the upper edge of the filter member 7 and the end plate 100 of the casing 2 and that a linear sealing section 8B thereof seals an area between the peripheral edge of the filter member 7 and the outer peripheral wall 4 of the casing 2. The sealing member 8 is fixed to the filter member 7 by an adhesive.

As clearly shown in FIGS. 1 and 5, the C-shaped upper sealing section 8A is offset from the C-shaped filter member 7. Specifically, the center 8c of the arc of the C-shape of the upper sealing section 8A is displaced from a center 7c1 of the arc of the C-shape of the filter member 7 in a direction parallel to a plain surface 4A of the outer peripheral wall 4.

The filter member 7 is accommodated in the casing 2 such that it is inserted into the space between the inner peripheral wall 3 and the outer peripheral wall 4 after the adhesive is applied on its lower surface 7C. Then, the end plate 100 is adhered to the casing 2.

Figure 7B:
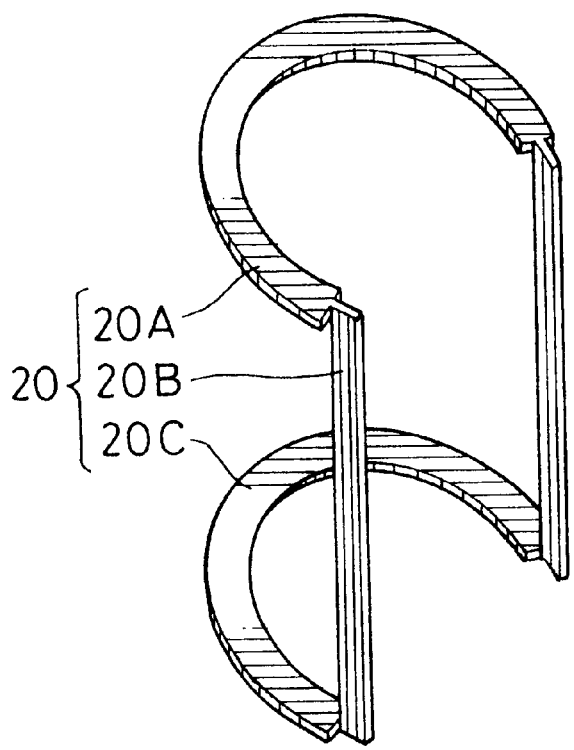

FIG. 7b is an example of a sealing member 20 provided separately from the filter member 7. The sealing member includes a peripheral sealing section 20B, an upper sealing section 20A and a lower sealing section 20C. When sealing an area between the filter member 7 and the casing 2 by using the sealing member 20, the upper sealing section 20A, the peripheral sealing section 20B and the lower sealing section 20C of the sealing member 20 are fixed to the filter member 7, and then the filter member 7 is assembled in the casing 2. In this case, it is not necessary to adhere the lower surface 7C of the filter member 7 to the casing 2.

When the space formed between the inner peripheral wall 3 and the outer peripheral wall 4 forms a D-shaped ring, a cylindrical filter can be used. In this case, only the axial upper edge and lower edge of the filter member 7 are sealed. The sealing member used for the fuel filter 1 of the present invention can be modified in accordance with the construction of the filter member.

As clearly shown in FIG. 1, casing 2 has thereon a return pipe or a return path 16 into which return fuel from a pressure regulator is introduced. The return path 16 with a closed end is provided with a plurality of branch paths 17.

As mentioned above, in this embodiment, the C-shaped upper sealing section 8A is offset from the filter member 7 of the C-shaped cross section in a left side direction of FIGS. 1 and 5. Consequently, on the left side of FIG. 1, the inside area of the sealing section 8A is larger than the outside area thereof, while, on the right side of FIG. 1, the inside area of the sealing section 8A is smaller than the outside area thereof. The fuel outlet 14 is formed at the left enlarged inside area and the fuel inlet 13 is formed at the right enlarged outside area. Because of the offset of the upper sealing section 8A, cross sectional areas of the fuel outlet 14 and the fuel inlet 13 are sufficiently ensured.

In this embodiment, C-shaped sealing section 8A of the sealing member 8 is displacedly mounted on the upper edge 7A of the filter member 7 in order to ensure the space for forming the fuel inlet 13 and the fuel outlet 14. However, this space may be ensured by modifying the shape of the upper sealing member 8A.

The construction of a module in which the fuel pump, the fuel filter 1 and other attachments are assembled will now be described with reference to FIGS. 8 and 9.

A fuel pump 30 inserted from the inserting port 6 of the fuel filter 1 is accommodated in an interior space 5 surrounded by the inner peripheral wall 3. A discharge port 31 of the fuel pump 30 is mounted via a spacer 32 and a bush 33 to the mounting hole 11 on the inlet side of the casing 2.

The casing 2 in which the fuel pump 30 is assembled is inserted into a housing 40 with a cushion 41 abutting on its bottom. The housing 40 is a cylindrical member having a bottom and an open top and having a D-shaped cross section slightly larger than the D-shaped cross section of the outer peripheral wall 4. A set plate 50 is mounted on the housing 40 such that an opening 42 formed at the top end of the housing 40 engages an engaging portion 51 of the set plate 50. A cushion 52 is interposed between the set plate 50 and the casing 2.

The mounting hole 15 of the outlet side provided to the casing 2 is connected to the mounting hole 54 provided to the set plate 50 via a fuel supply pipe 60 and an O-ring 61. The mounting hole 54 communicates through a fuel passage 55 with the main pipe mounting portion 56. Further, a return fuel discharge port 57 communicating with a return pipe mounting portion 58 faces the return path 16 provided to the casing 2. The return fuel discharge port 57 may be connected to the return path 16. A power connector 53 mounted on the set plate 50 is connected to a power terminal of the fuel pump 30. A suction filter 34 is set to an intake port of the fuel pump 30.

As has been described above, the housing 40 wherein the fuel pump 30 and the fuel filter 1 are assembled is inserted from the hole provided at the fuel tank and is fixed therein.

The operation of the module shown by FIGS. 8 and 9 will now be described. The fuel pump 30 intakes the fuel in the fuel tank via the suction filter 34 to supply the fuel to the fuel inlet chamber 9 through the discharge port 31, the fuel passage 12, and the fuel inlet 13. The fuel in the fuel inlet chamber 9 is fed to the fuel outlet chamber 10 through the filter member 7, and is then, supplied to fuel injectors through the fuel outlet 14, the fuel supply pipe 60, the fuel passage 55, the main pipe mounting portion 56, and a main pipe (not shown).

The pressure regulator (not shown) discharges the fuel to the return pipe when the pressure of the fuel supplied from the main pipe to the fuel injectors exceeds a predetermined pressure.

The fuel discharged to the return pipe is once introduced to the return path 16 through the return pipe mounting portion 58, the fuel passage 55 and the return fuel discharge port 57. Then, the fuel passes through a plurality of branch paths 17 provided in the fuel return passage 16 and is returned along the casing 2 into the fuel tank. This fuel returning mechanism provides such operations as energy absorption in the return passage and energy distribution to the plurality of the branch paths, thus decreasing returning noise compared with the case when the discharged fuel is returned into the fuel tank directly from the return pipe.

Figure 10:
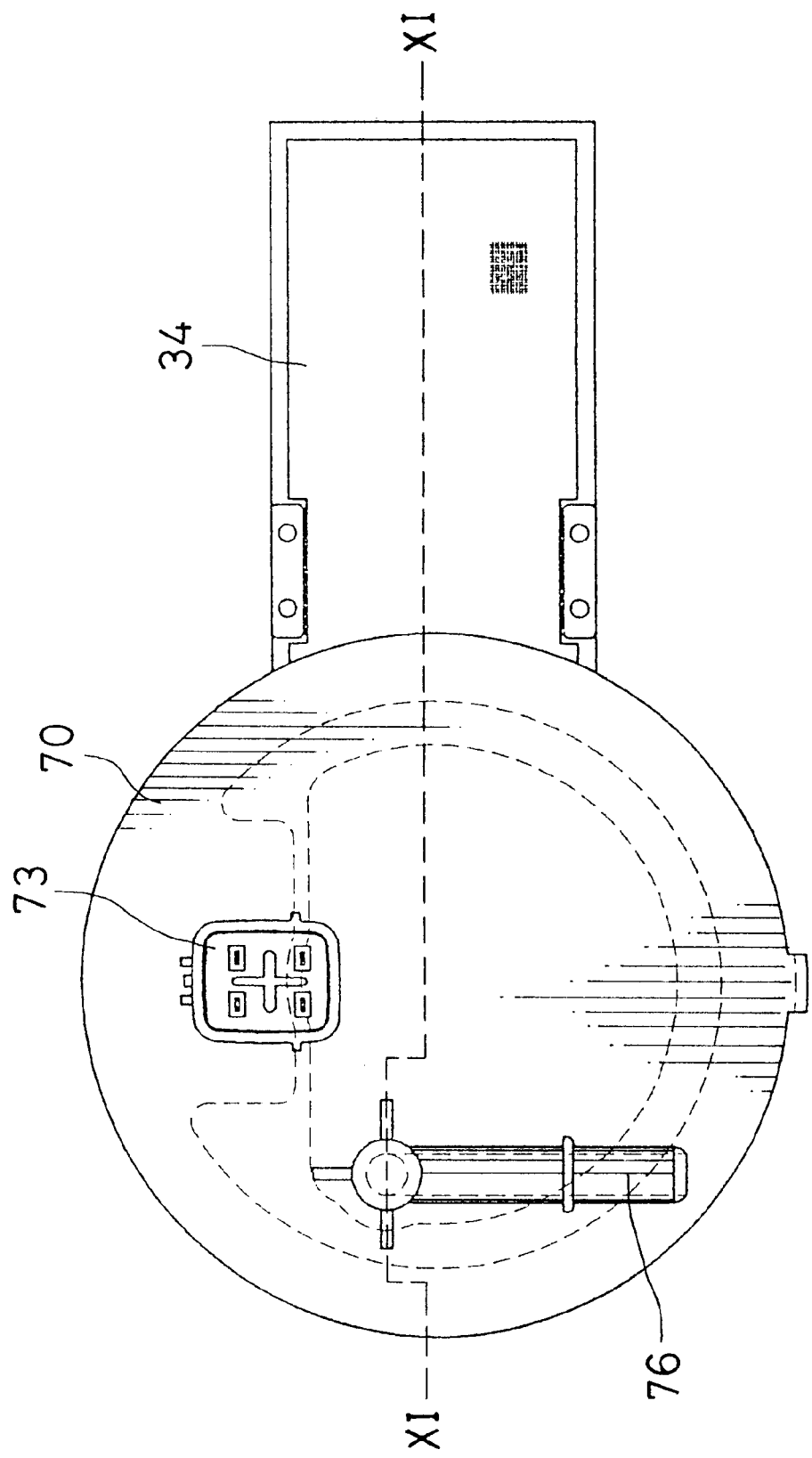
FIG. 10 is a view showing a fuel filter module of an embodiment to which a fuel pump, a fuel filter and a pressure regulator are assembled.
Figure 11:
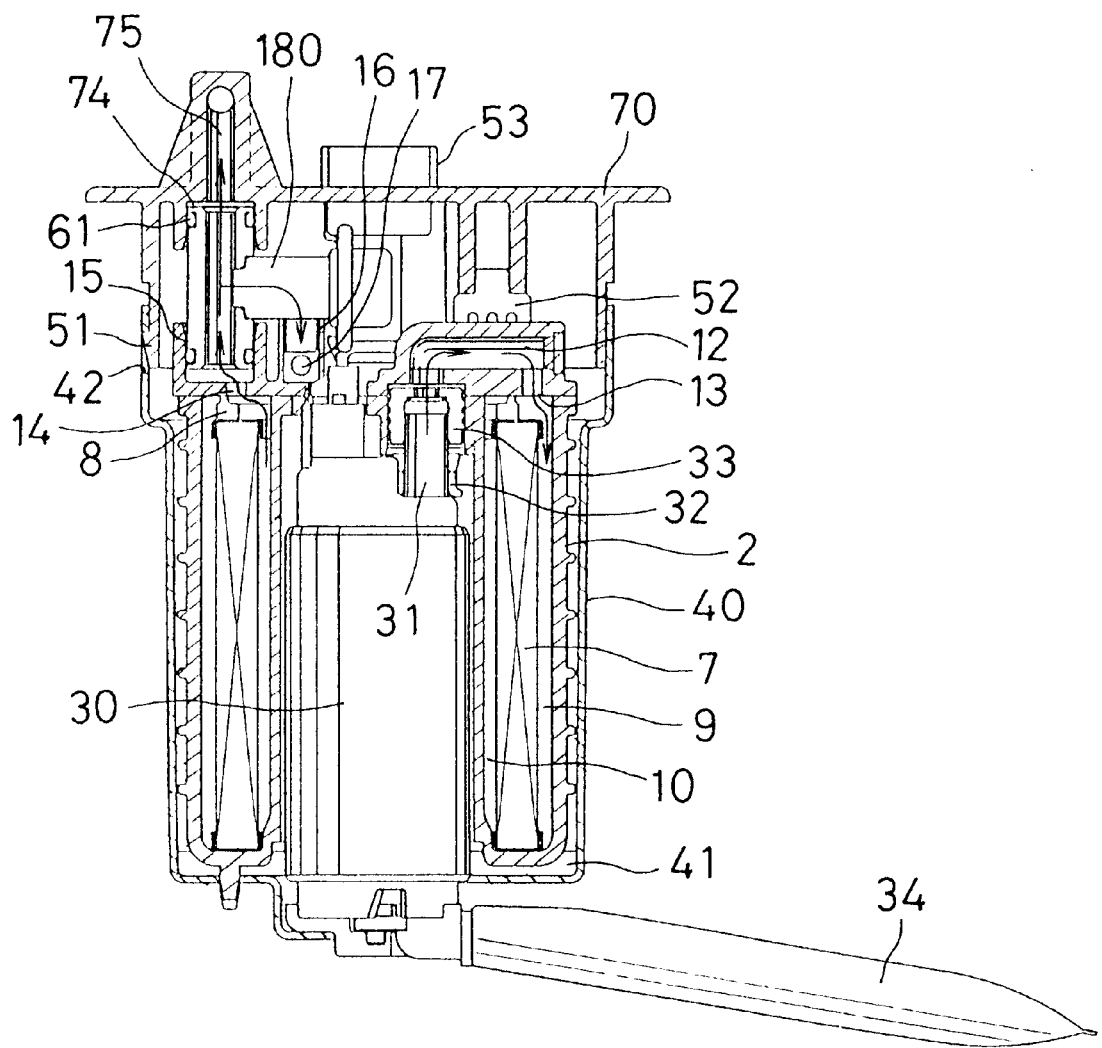
FIG. 11 is a vertical sectional view taken along line XI—XI of FIG. 10.

FIGS. 10 shows another module in which the fuel pump 30, the fuel filter 1 and a pressure regulator 180 are assembled, and FIG. 11 shows a vertical sectional view taken along line XI—XI of FIG. 10.

Figure 8:
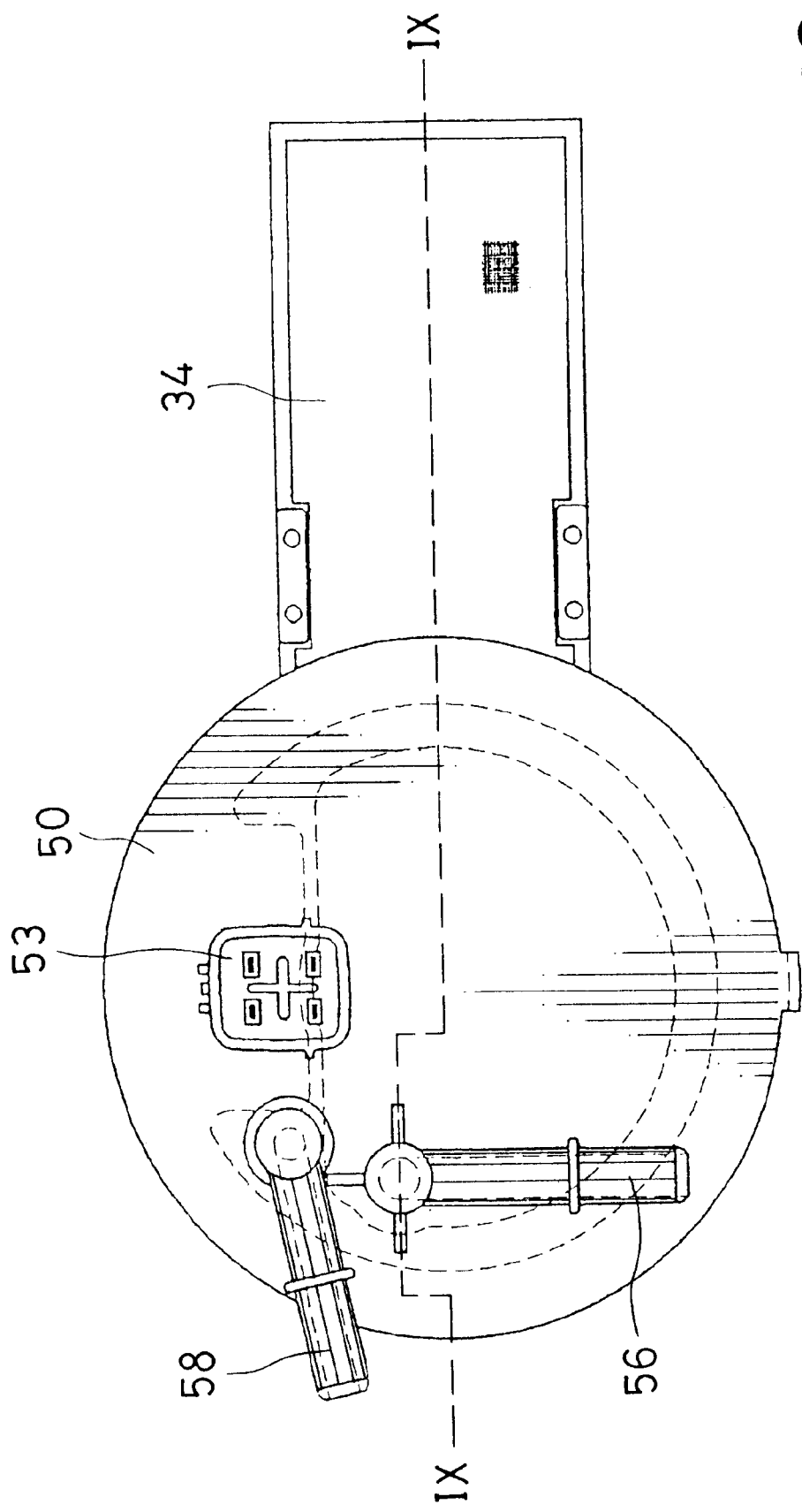
FIG. 8 is a view showing a fuel filter module of the embodiment to which a fuel pump and the fuel filter are assembled.
Figure 9:
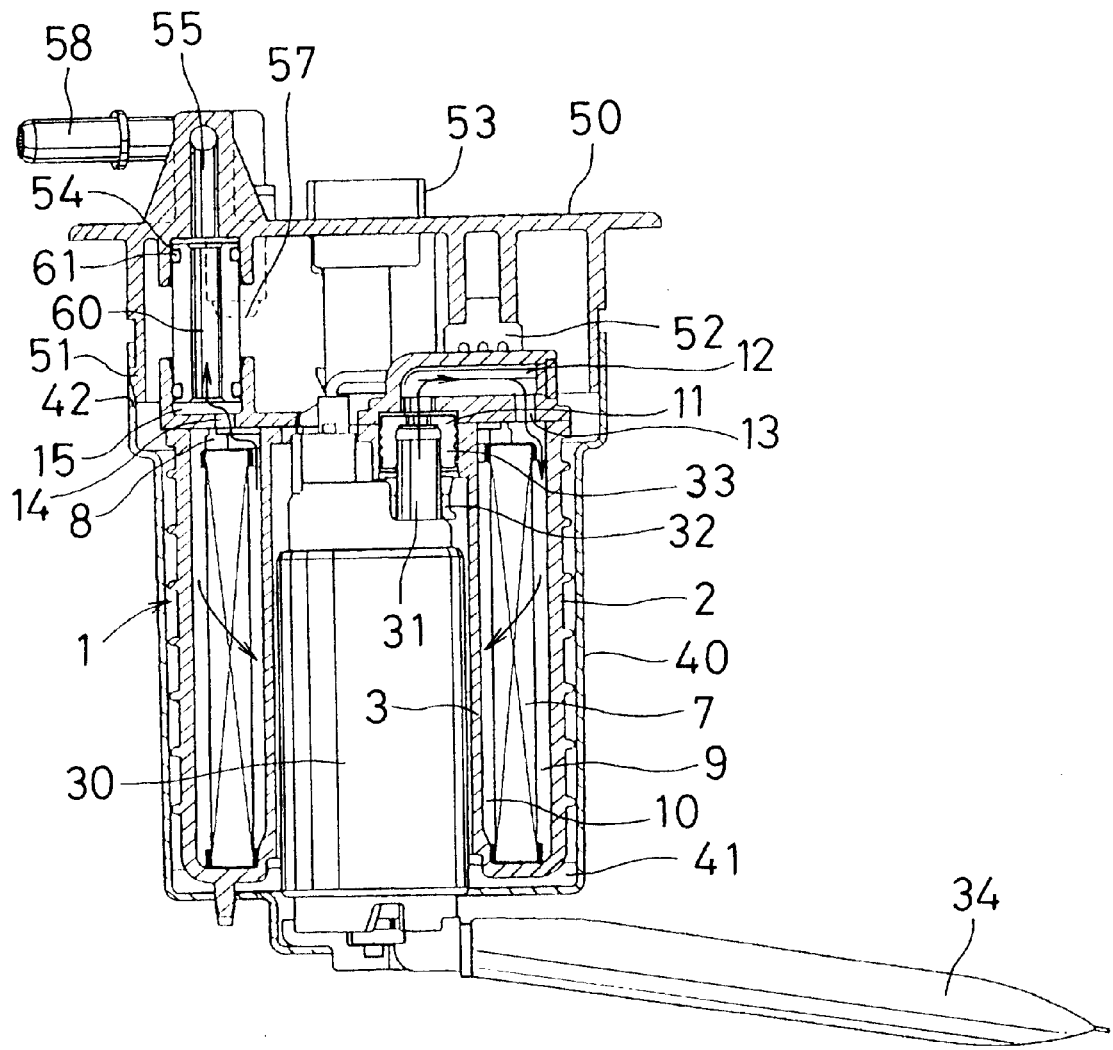
FIG. 9 is a vertical sectional view taken along line IX—IX of FIG. 8.

In this module, as with the module shown in FIGS. 8 and 9, the fuel pump 30 is assembled in the casing 2 of the fuel filter 1, the casing 2 is inserted into the housing 40, and the upper end of the housing 40 is closed with the set plate 70. The cross section of the housing 40 is formed into a D-shape so as to conform with the shape of the casing 2.

This module has a pressure regulator 180 mounted between the mounting hole 15 of the fuel outlet side provided to the casing 2 and the mounting hole 74 provided to the set plate 70. The mounting hole 74 communicates with the main pipe mounting portion 76 via the fuel passage 75.

The pressure regulator 180 receives the fuel flowing out from the outlet side mounting hole 15 to then allow the fuel to escape when the fuel pressure is too high. A fuel escape port faces the fuel return path 16. In place of the above construction, the fuel escape port of the pressure regulator 180 can be connected to the fuel return path 16. Other construction of the module is the same as that shown in FIGS. 8 and 9, and their description will not be repeated.

The operation of the module shown in FIGS. 10 and 11 will now be described. The fuel sucked by the fuel pump 30 is fed to the pressure regulator 180 through the discharge port 31, the fuel passage 12, the fuel inlet 13, the fuel inlet chamber 9, the filter member 7, the fuel outlet chamber 10, and the fuel outlet 14. When the fuel pressure is below the predetermined pressure, the pressure regulator 180 supplies the fuel to the fuel injectors through the fuel passage 75, the main pipe mounting portion 76 and a main pipe (not shown). When pressure of the fuel introduced into the pressure regulator 180 exceeds the predetermined pressure, the fuel is discharged from the fuel escape port to the fuel return path 16. The fuel discharged to the return path 16 is returned from a plurality of the branch paths 17 along the casing 2 into the fuel tank. In this case, it is not necessary to provide the return pipe mounting portion 58 and like elements required for the module of FIG. 8.

Figure 12:
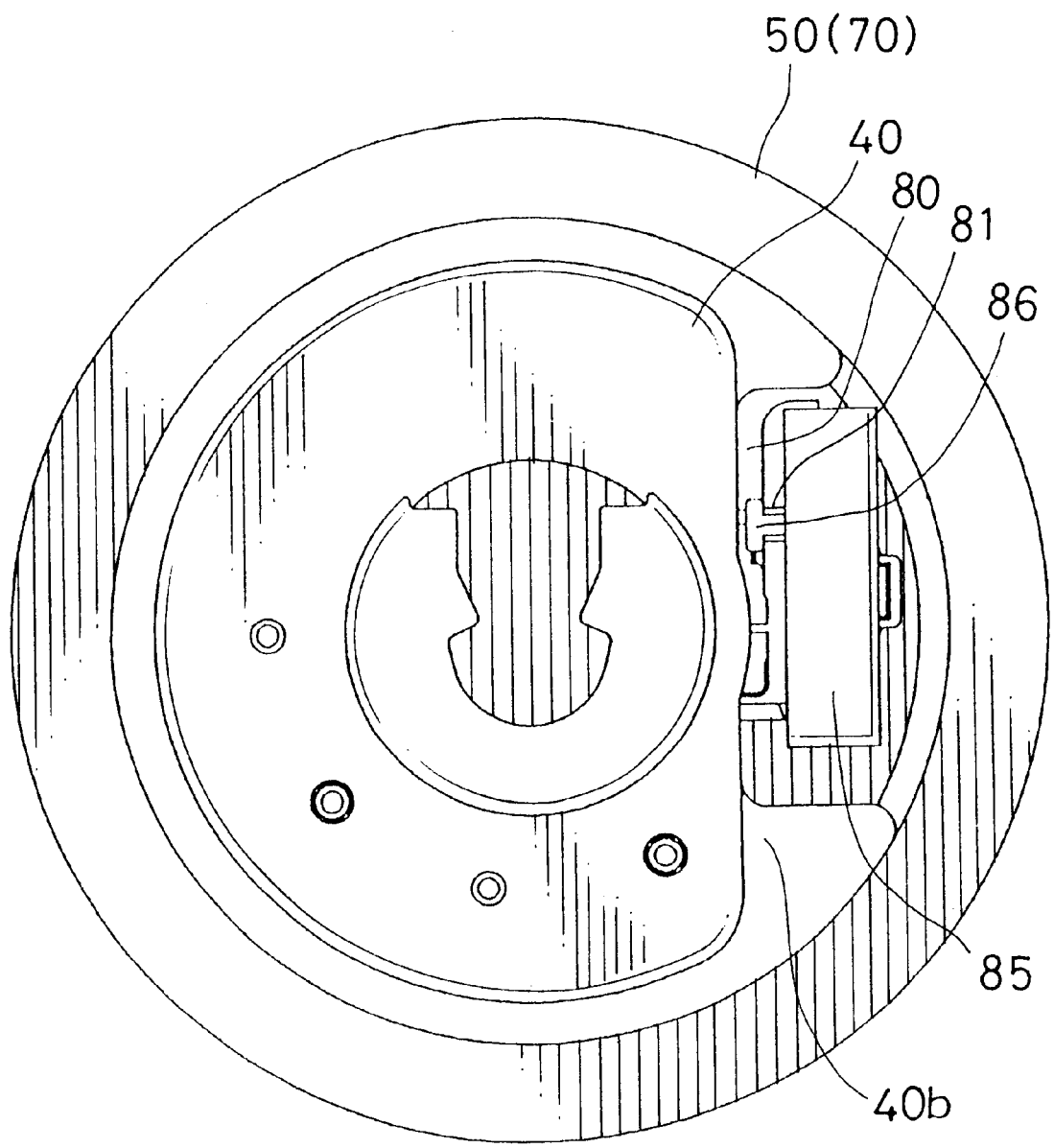
FIG. 12 is a view showing the fuel filter module of the embodiment to which an attachment is assembled.
Figure 13:
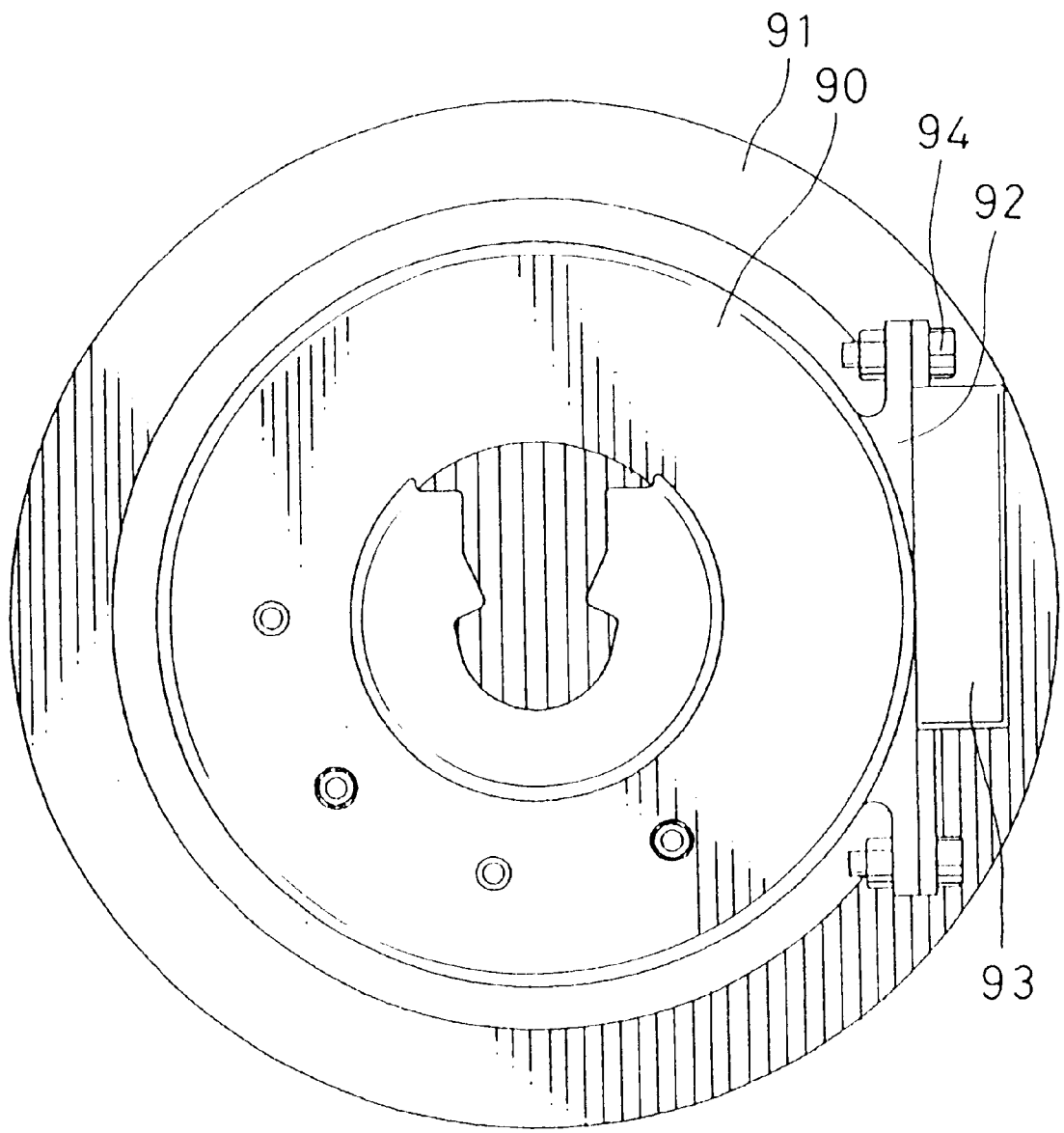
FIG. 13 is a view showing a conventional fuel filter module to which an attachment is assembled.

FIG. 12 shows a manner in which an attachment such as a sensor is assembled to the housing 40 which accommodates the fuel filter 1, the fuel pump 30 and the pressure regulator 80.

A sensor mounting portion 80 is attached to a region 40b of the housing 40 which is formed to have a D-shaped cross section. The sensor 85 such as a fuel gauge, a thermister or the like is assembled to the housing 40 such that an engaging arm 86 provided to the sensor 85 engages a groove 81 provided to the mounting portion 80.

As seen in FIG. 12, the attachment 85 is mounted on the cut region 40b of the housing 40. Thus, the outer diameter of the module on which the attachment is mounted is about the same as that of the housing 40. Thus, the module in which the attachment is assembled can be inserted into the fuel tank from a relatively small inserting port.

The casing 2 of the fuel filter 1 may be formed to have a C-shaped cross section instead of D-shaped cross section of the above embodiment. Also in this case, the outer diameter of the module can be reduced.

However, with the C-shaped cross section, when the fuel pump 30 is inserted into the casing 2, the periphery of the fuel pump 30 is not entirely covered with the casing 2. Thus, noise generated by the fuel pump 30 is not effectively cut off compared with the case of D-shaped cross section.

Further, when the casing is made of synthetic resin, fuel is statically charged. With the D-shaped cross section, sufficient area is ensured to spontaneously discharge the static electricity, thus increasing the effect of eliminating the static electricity from the fuel.

On the other hand, the area for discharging the static electricity of the C-shaped cross section is smaller than that of the D-shaped cross section. Thus, C-shaped cross section is not better than the D-shaped cross section with the static electricity eliminating effect.

According to the fuel filter of the present invention, the fuel filter module to which the accessory is assembled can be inserted into the fuel tank from the small inserting port, and the noise cut-off effect and the static electricity eliminating effect is improved.

What is claimed is:

1. A fuel filter comprising:

a housing comprising an inner wall section having a substantially round cross-section coaxially surrounding a central axis, an outer peripheral wall including a first arcuate portion coaxially surrounding a radially outer portion of said inner wall section, a second portion integrally joining a first end of said first arcuate portion to the inner wall section, and a third portion integrally joining a second end of said first arcuate portion to said inner wall section, wherein said first arcuate portion, said second portion, said third portion, and part of said inner wall section together define a radially outermost surface having a substantially D-shaped cross section, wherein said inner wall section includes a radially inner surface defining a cylindrical recess, and wherein a radially outer surface of said inner wall section, a radially inner surface of said first arcuate portion and interior surfaces of said second and third portions together define a C-shaped recess, first closure means for closing one axial end of said C-shaped recess, second closure means for closing the other axial end of said C-shaped recess, a fuel inlet for feeding fuel into said C-shaped recess through said first closure means, and a fuel outlet for directing fuel out of said C-shaped recess through said first closure means;

filtering means having a substantially C-shaped cross-section disposed within said C-shaped recess between the fuel inlet and the fuel outlet, wherein the C-shaped cross section of said filtering means is coaxially aligned with respect to the C-shaped recess defined in said housing;

means for pumping fuel into the fuel inlet through the filtering means and to the fuel outlet, the pumping means being disposed within said cylindrical recess.

2. A fuel filter as defined in claim 1, wherein the housing comprises a synthetic resin.

3. A fuel filter as defined in claim 1, wherein the C-shaped cross section of the filtering means is coaxially aligned with said central axis.

4. A fuel filter as defined in claim 3, wherein said first closure means is an end plate which is disposed on an axial end of the housing for closing said C-shaped recess, and an arcuate sealing member is disposed between an interior surface of said end plate and an axial edge of the filtering means, wherein a geometrical center of said arcuate sealing member is laterally offset from said central axis.

5. A fuel filter as defined in claim 4, wherein axes of the fuel inlet and-the fuel outlet are disposed in parallel alignment with said central axis and extend through said end plate.

6. The fuel filter as defined in claim 1, wherein the first closure means is an end plate disposed on the housing, the end plate defining the fuel inlet and the fuel outlet.

7. The fuel filter as defined in claim 1, further comprising a sensor mounting portion on a flat plane surface of the radially outermost surface of the D-shaped cross section of the housing.

\* \* \* \* \*

UNITED STATES PATENT AND TRADEMARK OFFICE
CERTIFICATE OF CORRECTION

PATENT NO. : 5,900,140
DATED : May 4, 1999
INVENTOR(S) : Takashi NAGAI et al

It is certified that error appears in the above-identified patent and that said Letters Patent is hereby corrected as shown below:

Title page:

after [73] Assignee: Aisan Kogyo Kabushiki Kaisha, correct the city as follows:

--Obu-shi, Aichi-ken--;

Add the second assignee as follows:

--Tokyo Roki Co., Ltd., Yokohama-shi, Kanagawa-ken, Japan--.

Signed and Sealed this

Twentieth Day of June, 2000

Attest:

Q. TODD DICKINSON

Attesting Officer

Director of Patents and Trademarks